United States Patent [19]
Lindquist

[11] 3,748,900
[45] July 31, 1973

[54] RATE OF CHANGE OF ENERGY INDICATOR
[75] Inventor: Oiva Herbert Lindquist, Minneapolis, Minn.
[73] Assignee: Honeywell Inc., Minneapolis, Minn.
[22] Filed: Nov. 4, 1971
[21] Appl. No.: 195,744

[52] U.S. Cl. ............................................. 73/178 R
[51] Int. Cl. ........................................... G01c 21/00
[58] Field of Search ...................... 73/178 R, 178 T, 73/398 R

[56] References Cited
UNITED STATES PATENTS
3,667,293   6/1972   Moore.............................. 73/398 R Primary Examiner—Donald O. Woodiel
Attorney—Charles J. Ungemach, George W. Field et al.

[57] ABSTRACT
Apparatus for providing a pilot of an airplane with an indication of the rate of change of specific energy of the airplane.

6 Claims, 2 Drawing Figures

OIVA HERBERT LINDQUIST
INVENTOR.

BY George M Field
ATTORNEY

RATE OF CHANGE OF ENERGY INDICATOR

BACKGROUND OF THE INVENTION

The present invention is a new instrument for use in high performance aircraft.

The present invention utilizes the concept of specific energy, that is the energy per unit weight of the airplane, to aid the pilot in maneuvering his airplane efficiently. The concept of specific energy is discussed in an article written by E. S. Rutowski in the Journal of Aeronautical Science, Mar., 1954, pages 187–195 inclusive. The word "energy" shall hereinafter refer to specific energy unless otherwise indicated. The energy of an airplane is the sum of the kinetic energy and the potential energy which are functions of the airplane's true airspeed and altitude, respectively. Since certain maneuvers are performed to either increase or decrease the energy of the airplane and other maneuvers are performed simply as interchanges of kinetic and potential energy, that is as constant energy maneuvers, an indication of the rate of change in energy may help the pilot to execute these maneuvers more efficiently.

A further use for the present invention is that it provides the pilot with a means to gauge the performance characteristics of his airplane through an indication of an abnormal rate of change in energy for a particular maneuver.

SUMMARY OF THE INVENTION

The present invention utilizes the concept of energy for indicating the rate of change in the energy of an airplane to the pilot. The pilot is then able to gauge his performance at maneuvering his airplane and the performance characteristics of his airplane, and he is also able to more efficiently operate his airplane since the present invention provides an immediate indication of whether the airplane is gaining, losing, or maintaining its energy.

DESCRIPTION OF THE PREFERRED EMBODIMENT

Figure 1:
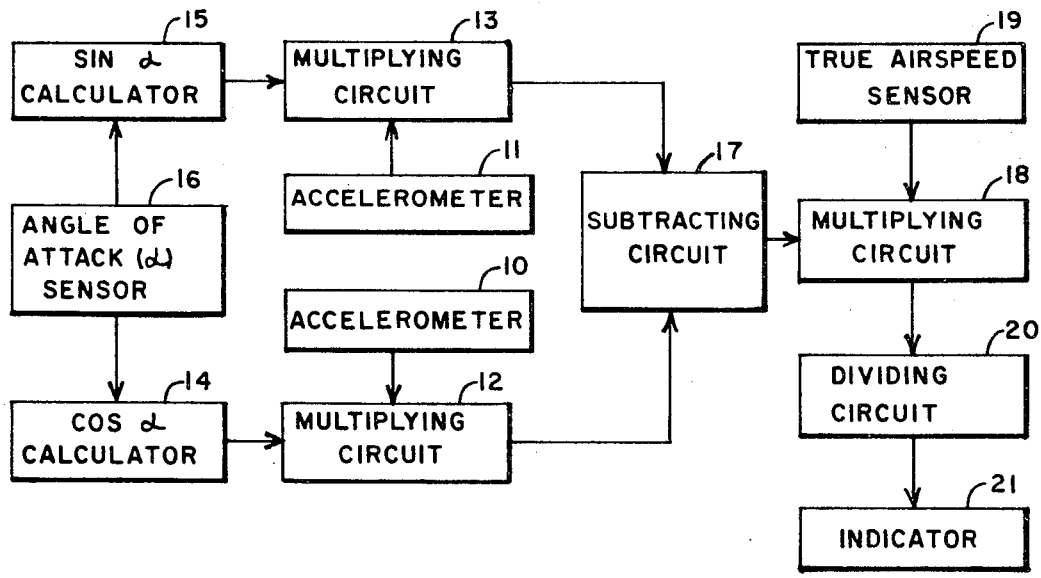
Figure 2:
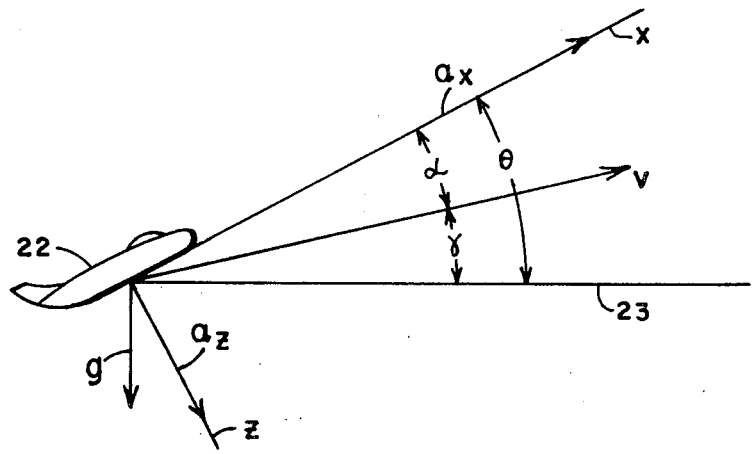

FIG. 1 is a block diagram of a preferred embodiment of the present invention; and FIG. 2 shows the geometry assumed by the operation of the present invention.

Referring to FIG. 1, an accelerometer 10 and an accelerometer 11 are installed in an airplane to sense longitudinal acceleration and the normal acceleration respectively of the airplane. The outputs from accelerometers 10 and 11 are connected to a multiplying circuit 12 and a multiplying circuit 13 respectively.

A cos $\alpha$ calculator 14 and a sin $\alpha$ calculator 15 are connected to receive a signal $\alpha$ representative of the angle of attack of the airplane from an angle of attack sensor 16. The outputs of calculators 14 and 15 are connected to multiplying circuits 12 and 13 respectively.

The outputs from multiplying circuits 12 and 13 are connected to a subtracting circuit 17, and the output from subtracting circuit 18 is connected to a multiplying circuit 18. Multiplying circuit 18 is also connected to receive a signal from a true airspeed sensor 19. A dividing circuit 20 is connected to receive the output from multiplying circuit 18. The output from dividing circuit 20 is connected to an indicator 21.

OPERATION OF THE INVENTION

The rate of change in energy E of the airplane in which the present invention is installed, is determined from the following expression:

$$\dot{E} = ]a_L \cos \alpha - a_N \sin \alpha\, ]v/g \tag{1}$$

where $a_L$ is the longitudinal acceleration of the airplane, $a_N$ is the normal acceleration of the airplane, $\alpha$ is the angle of attack of the airplane, $v$ is the true airspeed of the airplane, and $g$ is the acceleration due to gravity. Referring to FIG. 2, an airplane 22 has a longitudinal axis $x$ and a normal axis $z$ that is perpendicular to axis $x$. A flight path velocity vector $v$ indicates the direction of flight of airplane 22. A line 23 represents a flight path that is essentially level with the earth's surface. The angle of attack $\alpha$ is the angle between axis $x$ and vector $v$. An angle $\gamma$ defines the angle between vector $v$ and line 23. The sum of angles $\alpha$ and $\gamma$ is given by an angle $\theta$.

From the geometry of FIG. 2 it follows that the flight path acceleration of airplane 21 is $$\dot{v} = a_x \cos \alpha + a_z \sin \alpha \tag{2}$$

where $a_x$ and $a_z$ are the accelerations of the airplane 21 along axes $x$ and $z$ respectively. The longitudinal and normal accelerations of airplane 22 that are measured by accelerometers 10 and 11 respectively are $$a_L = a_x + g \sin \theta \tag{3}$$

and $$a_N = -(a_z - g \cos \theta) \tag{4}$$

Substituting equations (3) and (4) into equation (2) gives $$\dot{v} = (a_L - g \sin \theta) \cos \alpha - (a_N - g \cos \theta)( \sin \alpha \tag{5}$$

which reduces to $$\dot{v} = a_L \cos \alpha - a_N \sin \alpha - g \sin \gamma \tag{6}$$

Now, the total energy $E_T$ of airplane 22 is $$E_T = E_K + E_p \tag{7}$$

where $E_K$ and $E_p$ are the kinetic and potential energies of airplane 22.

Since $$E_K = \tfrac{1}{2}mv^2 \tag{8}$$

and $$E_p = mgh \tag{9}$$

where $m$ is the mass of airplane 22 and $h$ is the altitude of airplane 22, then $$E_T = \tfrac{1}{2}mv^2 + mgh \tag{10}$$

by substituting equations (8) and (9) into equation (7).

Because the present invention is concerned with specific energy E, that is the energy per unit weight of airplane 22, the relationship $$m = w/g \tag{11}$$

where $w$ is the weight of airplane 22, may be used to reduce equation (10) to the following expression for specific energy:

$$E = v^2/2g + h \tag{12}$$

Differentiating equation (12) with respect to time yields $$\dot{E} = v\dot{v}/g + \dot{h} \qquad (13)$$

Since $\dot{h} = v \sin \gamma$ from FIG. 2, equation (13) can be written as $$\dot{E} = v/g \, (\dot{v} + g \sin \gamma) \qquad (14)$$

Substituting for $\dot{v}$ in equation (14) from equation (6), the rate of change in specific energy becomes $$\dot{E} = v/g \, (a_L \cos \alpha - a_N \sin \alpha - g \sin \gamma + g \sin \gamma) \text{ or}$$
$$\dot{E} = v/g \, (a_L \cos \alpha - a_N \sin \alpha) \qquad (15)$$

which is identical to equation (1) referred to earlier. The quantities $a_L$ and $a_N$ are determined by accelerometers 10 and 11 respectively. The angle of attack $\alpha$ of the airplane is determined by angle of attack sensor 16. The true airspeed $v$ of the airplane is determined by true airspeed sensor 19. Cos $\alpha$ calculator 15 and sin $\alpha$ calculator 16 compute the cosine of the angle of attack and the sine of the angle of attack respectively. Multiplying circuit 12 receives the electrical signals representative of the longitudinal acceleration of the airplane and the cosine of the angle of attack of the airplane and produces a first signal representative of their product. Multiplying circuit 13 receives electrical signals representative of the normal acceleration of the airplane and the sine of the angle of attack of the airplane and produces a second signal representative of their product.

Subtracting circuit 18 receives both the first and second signals from multiplying circuits 12 and 13 respectively and subtracts the second signal from the first signal producing a third signal representative of their difference. Multiplying circuit 18 receives the third signal from subtracting circuit 17 and a fourth signal from true airspeed sensor 19 representative of the true airspeed of the airplane. Multiplying circuit 18 produces a fifth signal representative of the product of the third and fourth signals. Dividing circuit 20 receives the fifth signal from multiplying circuit 18 and generates a sixth signal representative of the quotient derived by dividing the fifth signal by the constant $g$, the acceleration due to gravity. The output from dividing circuit 20 is received by indicator 21 which provides an indication to the pilot of the rate of change of energy of the airplane. Indicator 21 may be a meter, a digital readout device, or other visual indicator.

The present invention operates to enable the pilot to gauge his proficiency by allowing him to compare the actual rate of change in energy with the known normal rate for the same maneuver that is properly executed. Similarly, the pilot is able to gauge the performance of his airplane by comparing the actual and the prescribed rates of change in energy for the airplane during a particular maneuver that is properly executed.

A further use for the present invention is the implementation of airspeed-altitude interchanges at near constant energy. An airplane can very rapidly exchange airspeed for a higher altitude or altitude for a higher airspeed quickly through a near constant energy climbing maneuver or a near constant energy diving maneuver, respectively. The present invention enables a pilot to maneuver his airplane through various near constant energy maneuvers by maintaining the energy rate indication near zero throughout the maneuver. A gain or loss in energy during the maneuver is immediately indicated and may be immediately corrected by the pilot, thus enabling the pilot to operate the airplane at peak efficiency with the least loss of energy.

Also, the rate of change of energy may be correlated by the pilot with the rate of change of another flight variable such as altitude to insure the proper execution of maneuvers that require a specific change of energy and altitude for achieving a described flight objective.

I claim as my invention:

1. Apparatus for providing a pilot of an airplane with an indication of the rate of change of energy of the airplane comprising:
    first means for generating a first signal representative of the flight path acceleration of the airplane;
    second means for generating a second signal representative of the true airspeed of the airplane;
    third means connected to receive said first and second signals, said third means being operative to generate a third signal indicative of the product of said first and second signals; and
    output means connected to receive said third signal for producing an indication of the quotient derived by dividing said third signal by a value equal to the acceleration due to gravity.

2. The apparatus of claim 1 wherein said first means comprises in combination:
    a means for giving a fourth signal representative of the normal acceleration of the airplane;
    a means for giving a fifth signal representative of the longitudinal acceleration of the airplane;
    means for giving a sixth signal indicative of the angle of attack of the airplane; and
    computing means for deriving from said fourth, fifth, and sixth signals said first signal representative of the flight path acceleration of the airplane.

3. The apparatus of claim 2 wherein said second means is a true airspeed sensor.

4. The apparatus of claim 3 wherein said third means is a multiplying circuit.

5. The apparatus of claim 4 wherein said output means comprises:
    a dividing circuit for giving a seventh signal representative of the quotient of said third signal divided by a value equal to the acceleration due to gravity; and
    an indicator for producing a visual indication of said seventh signal.

6. An energy rate indicator comprising, in combination:
    means giving a first signal representative of the true airspeed v of an aircraft;
    means giving a second signal representative of the angle of attack $\alpha$ of the aircraft;
    means giving a third signal representative of longitudinal acceleration $a_L$ of the aircraft;
    means giving a fourth signal representative of normal acceleration $a_N$ of the aircraft;
    computer means connected to receive all said signals for giving an output representative of the following relation therebetween $$v/g \, (a_L \cos \alpha - a_N \sin \alpha)$$

where the constant $g$ is the acceleration due to gravity; and
    indicating means connected to said computer means for displaying said output.

* * * * *